(12) United States Patent
Yu et al.

(10) Patent No.: US 8,146,800 B2
(45) Date of Patent: Apr. 3, 2012

(54) APPARATUS FOR RECOGNIZING SECURITY CODE HAVING ELECTROMAGNETIC BAND-GAP PATTERN

(75) Inventors: Jong Won Yu, Daejon (KR); Hyeong Seok Jang, Gyeongsangbuk-do (KR); Won Gyu Lim, Daejon (KR); Won Seok Jeong, Gyeonggido (KR); Jin Ho Ryu, Daejon (KR); Hyun Mi Kim, Daejon (KR)

(73) Assignee: Korea Minting, Security Printing & ID Card Operating Corp., Daejeon (KR)

( * ) Notice: Subject to any disclaimer, the term of this patent is extended or adjusted under 35 U.S.C. 154(b) by 196 days.

(21) Appl. No.: 12/794,699

(22) Filed: Jun. 4, 2010

(65) Prior Publication Data
US 2011/0108617 A1 May 12, 2011

(30) Foreign Application Priority Data
Jun. 11, 2009 (KR) ........................ 10-2009-0052009

(51) Int. Cl.
*G06F 17/00* (2006.01)
(52) U.S. Cl. ...................... 235/375; 235/493; 235/449
(58) Field of Classification Search .................. 235/375, 235/449, 493, 487, 488, 380, 492; 343/787
See application file for complete search history.

(56) References Cited

U.S. PATENT DOCUMENTS

| 8,098,161 B2 * | 1/2012 | Lavedas ...................... 340/572.7 |
| 2010/0167666 A1 * | 7/2010 | Choudhury et al. ......... 455/90.2 |

\* cited by examiner

*Primary Examiner* — Edwyn Labaze
(74) *Attorney, Agent, or Firm* — Hershkovitz & Associates, LLC; Abraham Hershkovitz

(57) ABSTRACT

In an apparatus for recognizing a security code having an electromagnetic band gap (EBG) pattern which uses reflection and transmission characteristics of the EBG pattern, a voltage controlled oscillator generates a signal to a power divider, which divides the power of the signal into halves, and outputs a first signal through a waveguide to be incident on the EBG pattern. The waveguide receives a signal reflected from the EBG pattern and outputs the reflected signal to a phase detector. A circulator outputs the second signal to the phase detector, which detects the phase difference between the reflected signal and the second signal, and outputs phase difference data to a data control unit, which determines whether the security code having the EBG pattern is recognized using the phase difference data. In an alternate embodiment, the voltage control oscillator is controlled to sequentially generate signals using power difference data.

13 Claims, 8 Drawing Sheets

Code: 1 0 1 1

Code: 1 1 0 1

APPARATUS FOR RECOGNIZING SECURITY CODE HAVING ELECTROMAGNETIC BAND-GAP PATTERN

BACKGROUND OF THE INVENTION

1. Field of the Invention

The present invention relates to an apparatus for recognizing a security code having an electromagnetic band gap (EBG) pattern.

2. Description of the Related Art

Generally, Microwave Band Gap (MBG) structures or EBG structures are implemented on microstrips, and are used for various purposes, e.g., improving the performance of an antenna, improving the power efficiency of an amplifier, realizing the high quality (Q) of a resonator, controlling harmonic components, and designing a new type of duplexer. Microstrip circuits applied to such EBG structures can be manufactured using a method of punching a dielectric substrate, a method of etching a ground surface to have a uniform shape, and a method of changing a microstrip line itself.

SUMMARY OF THE INVENTION

Accordingly, the present invention has been made keeping in mind the problems occurring in the prior art, and an object of the present invention is to provide an apparatus which can identify and recognize a security code having an EBG pattern by detecting and digitizing it using reflection characteristics and transmission characteristics.

In order to accomplish the above object, the present invention provides an apparatus for recognizing a security code having an EBG pattern, the apparatus detecting and recognizing the security code of a security product on which an EBG pattern which resonates at a specific frequency is formed, the apparatus including: a voltage controlled oscillator for sequentially generating one or more incident signals having various frequencies; a power divider for dividing the power of each of the one or more incident signals generated by the voltage controlled oscillator into halves, and outputting a first incident signal and a second incident signal; a waveguide for enabling the first incident signal to be incident on the EBG pattern, and receiving a reflected signal reflected from the EBG pattern; a phase detector for detecting a phase difference between the reflected signal received by the waveguide and the second incident signal from the power divider, and generating and outputting phase data based on the detected phase difference; and a data control unit for determining whether the security code having the EBG pattern is recognized using the phase data received from the phase detector, and controlling the voltage controlled oscillator so that the voltage controlled oscillator can sequentially generate the incident signal.

The apparatus further includes a power amplifier for amplifying the power of the incident signal generated by the voltage controlled oscillator, and outputting a resulting signal to the power divider.

The apparatus further includes a circulator for transmitting the first incident signal from the power divider to the waveguide, and transmitting the reflected signal received by the waveguide to the phase detector.

The security product on which the EBG pattern is formed has Perfect Magnetic Conductor (PMC) reflection characteristics in which the phase difference between an incident wave and a reflected wave is 0° when resonance occurs, and has Perfect Electric Conductor (PEC) reflection characteristics in which the phase difference between the incident wave and the reflected wave is 180° when resonance does not occur.

The phase detector outputs an electrical signal having a voltage level which changes depending on the detected phase difference between the reflected signal and the second incident signal.

The data control unit includes: an analog-to-digital converter for converting the electrical signal received from the phase detector into a digital signal; a micro controller unit for determining whether the digital signal obtained by the conversion of the analog-to-digital converter is identical with a preset digital signal, and outputting a control signal which enables the voltage controlled oscillator to generate a subsequent incident signal depending on a result of the determination; and a digital-to-analog converter for converting the control signal received from the micro controller unit into an electrical signal, and outputting the electrical signal to the voltage controlled oscillator.

In an apparatus for recognizing a security code having an EBG pattern, the apparatus detecting and recognizing a security code of a security product on which an EBG pattern which resonates at a specific frequency is formed, the apparatus includes: a voltage controlled oscillator for sequentially generating one or more incident signals having various frequencies; a waveguide unit for enabling each of the incident signals generated by the voltage controlled oscillator to be incident on the EBG pattern, and receiving a transmitted signal passed through the EBG pattern; a power detector for calculating a power difference between the transmitted signal received by the waveguide unit and the incident signal, comparing sizes of the calculated power difference and a reference power difference, and generating and outputting power data based on the results of the comparison; and a data control unit for determining whether the security code having the EBG pattern is recognized using the power data from the power detector, and controlling the voltage controlled oscillator so that the voltage controlled oscillator can sequentially generate the incident signal.

The apparatus further includes a power amplifier for amplifying the power of the incident signal generated by the voltage controlled oscillator, and outputting a resulting signal to the waveguide unit.

The waveguide unit includes: a first waveguide for enabling the incident signal generated by the voltage controlled oscillator to be incident on the EBG pattern; and a second waveguide for receiving the transmitted signal passed through the EBG pattern.

The power detector outputs an electrical signal having a voltage level which changes depending on the result of the comparison of the sizes between the calculated power difference and the reference power difference.

The data control unit includes: an analog-to-digital converter for converting the electrical signal received from the power detector into a digital signal; a micro controller unit for determining whether the digital signal obtained by the conversion of the analog-to-digital converter is identical with a preset digital signal, and outputting a control signal which enables the voltage controlled oscillator to generate a subsequent incident signal depending on a result of the determination; and a digital-to-analog converter for converting the control signal received from the micro controller unit into an electrical signal, and outputting the electrical signal to the voltage controlled oscillator.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
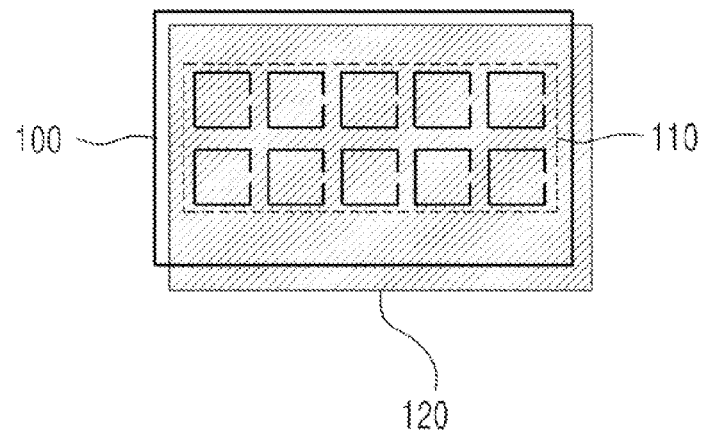
FIG. 1 is a diagram showing an example of a security product on which an EBG pattern is formed according to a first embodiment of the present invention.

Reference now should be made to the drawings, in which the same reference numerals are used throughout the different drawings to designate the same or similar components.

A method and an apparatus for recognizing a security code having an EBG pattern according to embodiments of the present invention will be described in detail below, with reference to the accompanying drawings.

First, a security product on which an EBG pattern having a resonance frequency is formed according to the first embodiment of the present invention will be described.

FIG. 1 is a view showing an example of a security product 100 on which a plurality of pieces of an EBG pattern 110 is formed according to the first embodiment of the present invention.

As shown in FIG. 1, the security product 100 according to the first embodiment of the present invention will be described using a security card 100 as an example. It s understood that the security product 100 according to the first embodiment of the present invention is not limited to the security card, and can be other products which require security, such as identification cards, marketable securities or ID related items.

A plurality of pieces of an EBG pattern 110 made of a conductive material are uniformly arranged on the security card 100 of FIG. 1. The EBG pattern 110 is not only formed in a square open loop pattern as shown in FIG. 1, but also can be mixed with a closed loop pattern and then uniformly arranged on the security card 100.

The EBG pattern 110 has a specific frequency at which resonance occurs. Since the security code is recognized using reflection characteristics in the first embodiment of the present invention, a PEC substrate 120 made of metal is disposed on the rear surface of the security card 100 on which the EBG pattern 110 is formed, so that the EBG pattern 110 has reflection characteristics.

As described above, if the PEC substrate 120 is disposed on the rear side of the EBG pattern 110, the EBG pattern 110 has basic reflection characteristics in which the wave incident on the EBG pattern 110 is reflected. Therefore, if the wave which is incident on the EBG pattern 110 is not at the resonance frequency, the incident wave hardly has any effect, so that the PEC substrate 120 functions as a reflective surface. Here, a phase difference between the reflected wave and the incident wave becomes 180°. Further, if the wave which is incident on the EBG pattern 110 is at the resonance frequency, the EBG pattern 110 shows PMC reflection characteristics in which the phase difference between an incident wave and a reflected wave is 0°.

Therefore, the phase difference between the incident wave and the reflected wave s used as a recognition element for the EBG pattern 110 in the first embodiment of the present invention, so that the security code can be identified and recognized depending on whether or not the EBG pattern 110 resonates.

Hereinafter, an apparatus for recognizing a security code having an EBG pattern, which can detect and recognize a unique code depending on when the EBG pattern 110 resonates and when the EBG pattern 110 does not resonate, will be described in detail using the resonance characteristics of the EBG pattern 110 of the present invention.

Figure 2:
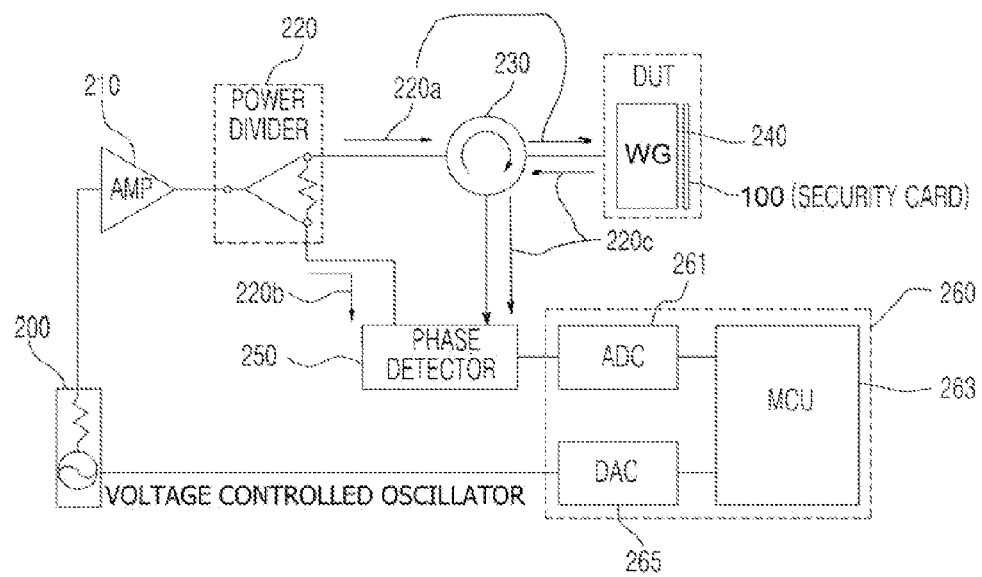
FIG. 2 is a block diagram schematically showing the configuration of an apparatus for recognizing a security code having an EBG pattern according to the first embodiment of the present invention.

FIG. 2 is a circuit diagram showing the configuration of the apparatus for recognizing an EBG pattern in order to recognize a security code having an EBG pattern which has reflection characteristics according to the first embodiment of the present invention.

Referring to FIG. 2, the apparatus for recognizing a security code having an EBG pattern according to the first embodiment of the present invention includes a voltage controlled oscillator 200, a power amplifier 210, a power divider 220, a circulator 230, a waveguide 240, a phase detector 250, and a data control unit 260.

The voltage controlled oscillator 200 sequentially generates various types of frequency signals. That is, the voltage controlled oscillator 200 sequentially generates and outputs desired frequency signals in a specific frequency band. Here, m frequency signals can be generated by the voltage controlled oscillator 200, and the m frequency signals are m incident signals to be incident on the security card 200 on which the EBG pattern is formed.

The power amplifier 210 amplifies the power level of each of the incident signals generated by the voltage controlled oscillator 200.

The power divider 220 divides the power of the amplified incident signal received from the power amplifier 210 into halves, and outputs a first incident signal 220a and a second incident signal 220b. The first incident signal 220a and second incident signal 220b of the output signals of the power divider 220 are respectively transmitted to the waveguide 240 through the circulator 230, and to the phase detector 250.

The circulator 230 transmits the first incident signal 220a received from the power divider 220 to the waveguide 240. The waveguide 240 enables the first incident signal 220a output from the circulator 230 to be incident on the security card 100 on which the EBG pattern is formed. Further, the waveguide 240 receives a reflected signal 220c from the EBG pattern 110, and sends the reflected signal 220c to the circulator 230. Here, the circulator 230 transmits the reflected signal 220c received from the waveguide 240 to the phase detector 250.

The phase detector 250 receives the reflected signal 220c transmitted through the circulator 230, and the second incident signal 220b transmitted from the power divider 220. Here, the phase detector 250 uses the second incident signal 220b as a reference phase signal. Therefore, the phase detector 250 detects the phase difference between the second incident signal 220b and the reflected signal 220c by comparing them.

Further, the phase detector 250 generates phase data based on the detected phase difference between the second incident signal 220b and the reflected signal 220c. Here, the phase data means an electrical signal generated based on the detected phase difference between the second incident signal 220b and the reflected signal 220c. The electrical signal can be a voltage signal at a high or low level. Here, the division into high level and low level can be performed using the absolute value of voltage, or using positive (+) voltage and negative (−) voltage. When division into high level and low level is performed using the absolute value of voltage, the voltage at a high level can be a voltage value greater than 0 V, that is, a voltage value greater than a reference value, and the voltage at a low level can be 0 V.

If a phase difference exists between the second incident signal 220b and the reflected signal 220c, the phase detector 250 can generate an electrical signal at a high level, and if the phase difference is 0°, the phase detector 250 can generate an electrical signal at a low level.

The data control unit 260 receives a high or low level electrical signal from the phase detector 250, and determines whether the EBG security code is recognized using the received electrical signal. Further, the data control unit 260 functions to control the voltage controlled oscillator 200 so that the voltage controlled oscillator 200 can generate a subsequent incident signal depending on whether or not the EBG security code is recognized.

The data control unit 260 includes an analog-to-digital converter 261, a micro controller unit 263, and a digital-to-analog converter 265.

The analog-to-digital converter 261 converts the electrical signal received from the phase detector 250 into a digital signal. For example, if the voltage of the electrical signal received from the phase detector 250 is at a high level, the analog-to-digital converter 261 can convert the electrical signal into a digital code 1, and if the voltage of the electrical signal is at a low level, the analog-to-digital converter 261 can convert the input electrical signal into a digital code 0.

The micro controller unit 263 compares the digital code 1 or 0 obtained by the conversion of the analog-to-digital converter 261 with a preset digital code 1 or 0, and determines whether they are identical with each other. Here, if the digital code generated by the analog-to-digital converter 261 is identical with the preset digital code, the micro controller unit 263 outputs a control signal so that the voltage controlled oscillator 200 can generate a subsequent incident signal. Here, the control signal from the micro controller unit 263 is converted into an electrical signal by the digital-to-analog converter 265, and then the resulting signal is output to the voltage controlled oscillator 200. Therefore, the voltage controlled oscillator 200 receives the electrical signal obtained by the conversion of the analog-to-digital converter 265, and then generates a subsequent incident signal.

If all the digital code generated using the EBG pattern is identical with the preset digital code, the micro controller unit 263 provides notification that the security code having an EBG pattern is recognized, and terminates the process of recognizing the EBG pattern.

Meanwhile, if the digital code generated using the EBG pattern is not identical with the preset digital code, the micro controller unit 263 provides notification that the security code having an EBG pattern is not recognized, and terminates the process of recognizing the EBG pattern.

Figure 3:
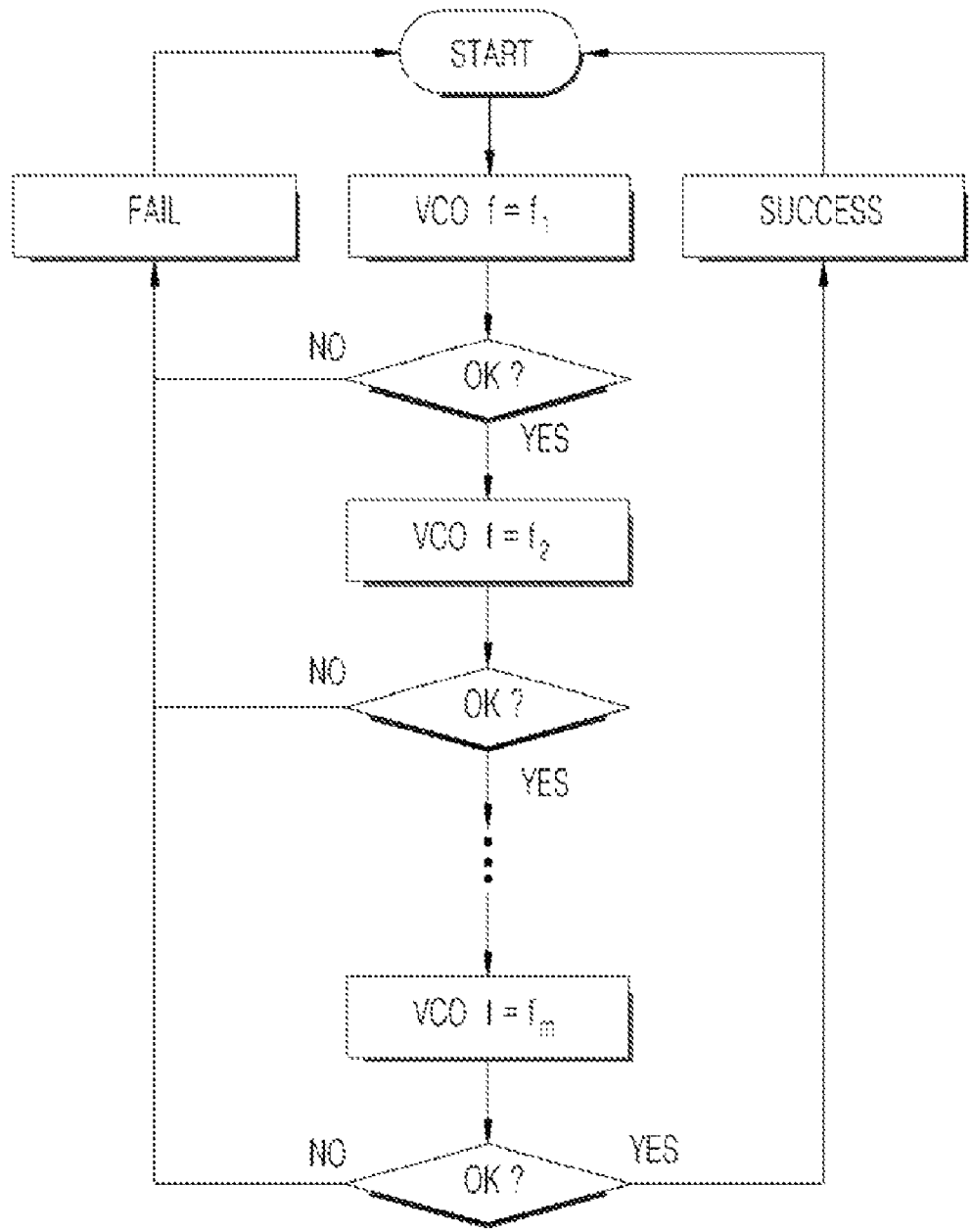
FIG. 3 is a flowchart showing a system for recognizing a security code having an EBG pattern according to the first embodiment of the present invention.

FIG. 3 is a flowchart for a system for recognizing a security code having an EBG pattern according to the first embodiment of the present invention.

In the flowchart of FIG. 3, VCO f=$f_1$ means that a first incident signal $f_1$ is generated by the voltage controlled oscillator 200 in order to recognize a security code having an EBG pattern. Further, "OK?" means that it is determined whether the frequency reflection characteristics of an EBG pattern detected by the system exist in an authentication range. Therefore, as shown in the flowchart of FIG. 3, it is sequentially determined whether the security code having an EBG pattern 210 exists in the authentication range with respect to each of m incident signals $f_1$ to $f_m$ generated by the voltage controlled oscillator 200. If, as a result of the determination, the security code having an EBG pattern 210 exists in the authentication range, it is determined as "success." Meanwhile, if it is determined that the security code having an EBG pattern 210 does not exist in the authentication range during the determination process, it is promptly determined as "failure."

Figure 4:
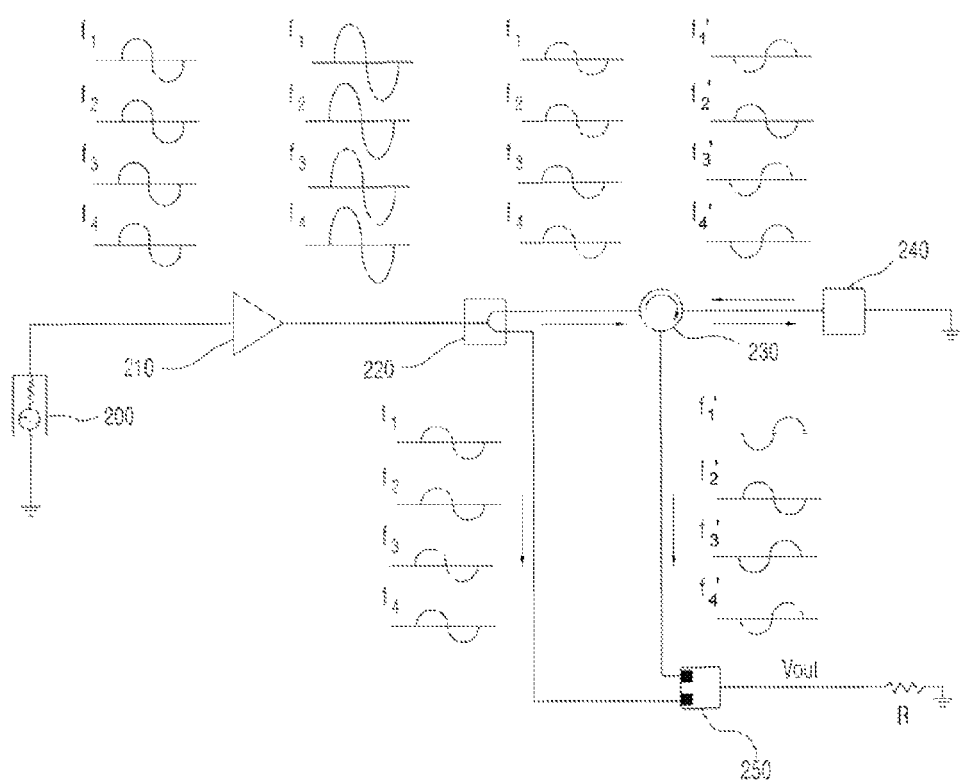
FIG. 4 is a view showing a simulation model for a system for recognizing a security code having an EBG pattern according to the first embodiment of the present invention.

FIG. 4 is a view showing a simulation model for a system for recognizing an EBG pattern which recognizes the reflection characteristics according to the first embodiment of the present invention.

As shown in FIG. 4, the system for recognizing an EBG pattern according to the first embodiment of the present invention uses the phase difference between incident waves $f_1$ to $f_4$ and reflected waves $f_1'$ to $f_4'$ in order to recognize the security code having an EBG pattern.

The signal wave forms $f_1$ to $f_4$ of FIG. 4 are illustrated by modeling signal wave forms appearing at respective ends. In FIG. 4, the signal wave forms $f_1$ to $f_4$ appearing at the front end of the circulator 230 (the signal wave forms shown in the left side of the circulator 230) are the wave forms of the signals which are incident on the security card 200 through the waveguide 240. Further, the signal wave forms $f_1'$ to $f_4'$ appearing at the rear end of the circulator 230 (the signal wave forms shown in the right side of the circulator 230) are the wave forms of the signals which are reflected from the security card 200.

With reference to the signal wave forms of the front and rear ends of the circulator 230 of FIG. 4, when the first signal $f_1$ generated by the voltage controlled oscillator 200 is incident, the EBG pattern 210 does not resonate. Therefore, the phase difference between the first reflected signal $f_1'$ and the first incident signal $f_1$ is 180°. Meanwhile, when the second signal $f_2$ is incident, the EBG pattern 210 resonates. Therefore, the phase difference between the second reflected signal $f_2'$ and the second incident signal $f_2$ is 0°. The process of detecting a phase difference is performed the same way through the fourth incident signal $f_4$ and the fourth reflected signal $f_4'$.

Figure 5A:
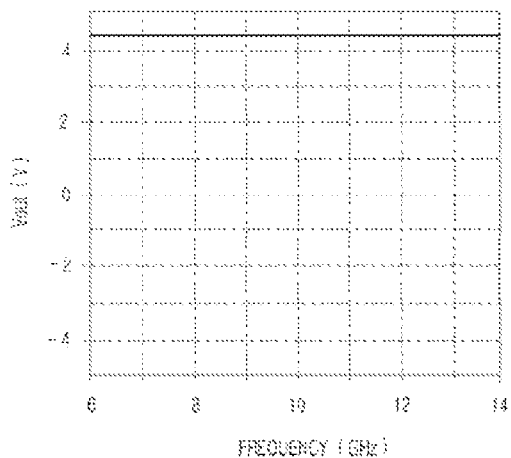
FIG. 5A is a graph showing the results of a simulation obtained by a phase detector for a security card on which an EBG pattern is not formed according to the first embodiment of the present invention.

FIG. 5A is a graph showing the results of a simulation obtained by processing a recognition process for a security card on which an EBG pattern is not formed.

Figure 5B:
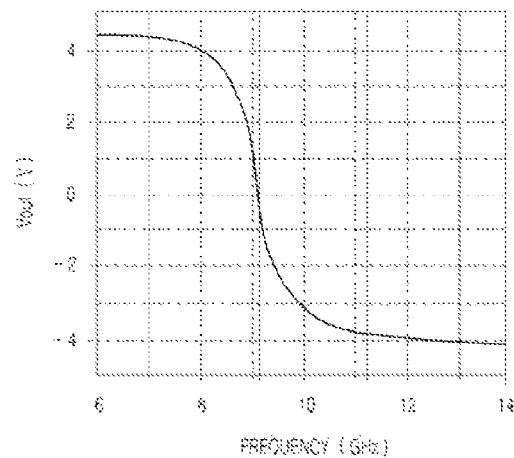
FIG. 5B is a graph showing the results of a simulation obtained by the phase detector for a security card on which an EBG pattern is formed according to the first embodiment of the present invention, and a method of digitizing the results.

FIG. 5B is a graph showing the results of a simulation obtained by processing the recognition process for a security card 200 on which an EBG pattern is formed according to the first embodiment of the present invention. That is, FIG. 5B is a view showing an electrical signal transmitted from the phase detector 250 of FIG. 2, and a method of digitizing the electrical signal.

With reference to FIG. 5B, the reflection characteristics of the EBG pattern are understood using incident signals having frequencies of 7 GHz, 9.2 GHz, 11.3 GHz, and 13 GHz, respectively. When the incident signals $f_1$, $f_3$ and $f_4$ having frequencies of 7 GHz, 11.3 GHz and 13 GHz are incident, resonance does not occur, so that a phase difference occurs between the incident waves and the reflected waves. Therefore, with regard to the frequencies of 7 GHz, 11.3 GHz, and 13 GHz, electrical signals $V_{out}$ at a high level of +4 V (7 GHz), −4 V (11.3 GHz) and −4 V (13 GHz) are output as the results of the detection performed by the phase detector 250. Here, although the voltage level is described as +/−4 V for convenience, this can mean any voltage level which enables the analog-to-digital converter to recognize the voltage level and generate the corresponding digital code.

Meanwhile, when the signal $f_2$ having a frequency of 9.2 GHz is incident, resonance occurs. Accordingly, the phase difference between the incident wave and the reflected wave is 0°, with the result that an electrical signal $V_{out}$ at a low level of 0 V (9.2 GHz) is output by the phase detector 250.

As described above, each of the electrical signals $V_{out}$ at a high or low level output from the signal phase detector 250 is converted into a digital code through the data control unit 260, and it is determined whether the digital code obtained by the conversion is recognized. For example, if, as a result of the detection of a phase difference for the incident signal of 7 GHz, an electrical signal $V_{out}$ at a high level, that is, +4 V (7 GHz), is transmitted by the phase detector 250 to the data control unit 260, the data control unit 260 converts the electrical signal $V_{out}$ into the digital code 1, and determines whether the digital code 1 obtained by the conversion is identical with a preset digital code. Here, when the digital codes are identical with each other, the data control unit 260 performs a process for detecting a phase difference for the subsequent incident signal of 9.2 GHz, receives an electrical signal $V_{out}$ at a low level, that is, 0 V, obtained as a result of the detection, and converts the electrical signal $V_{out}$ into the digital code 0.

Whether the digital code obtained by the conversion is identical with the preset digital code is determined by the micro controller unit 263. When the process of recognizing a security code for each of the incident signals $f_1$ to $f_4$ is ended in the above-described manner, a digital code 1011 is generated as shown in FIG. 5B, so that the security code of the security card 200 on which the EBG pattern is formed can be identified and recognized.

An apparatus for recognizing a security code having an EBG pattern according to a second embodiment of the present invention will now be described with reference to the accompanying drawings.

First, a security product in which the EBG pattern having a resonance frequency is formed according to the second embodiment of the present invention will be described.

Figure 6:
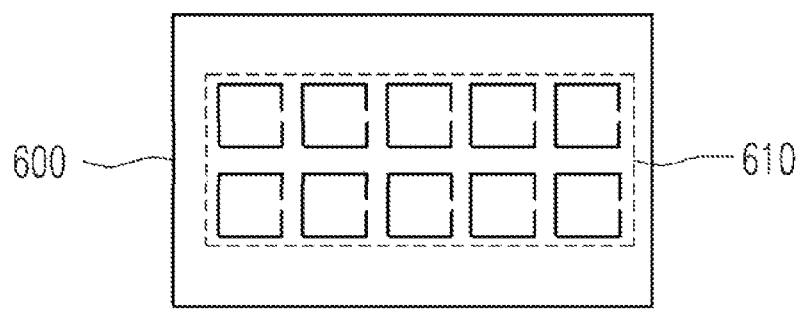
FIG. 6 is a diagram showing an example of a security product on which an EBG pattern is formed according to a second embodiment of the present invention.

FIG. 6 is a diagram showing an example of an EBG security product 600 in which an EBG pattern 610 is formed according to the second embodiment of the present invention.

As shown in FIG. 6, a security product 600 according to the second embodiment of the present invention will be described using a security card 600 as an example. It is to be understood that the security product 600 according to the second embodiment of the present invention is not limited to the security card, and can be other products which require security, such as identification cards, marketable securities, or ID related items.

A plurality of pieces of an EBG pattern 610 made of a conductive material are uniformly arranged on a security card 600 of FIG. 6. The EBG pattern 610 are not only formed in the square open loop pattern shown in FIG. 6, but also can be mixed with a closed loop pattern and then uniformly arranged on the security card 600.

The EBG pattern 610 has a specific frequency at which resonance occurs. When the EBG pattern 610 resonates, the power of a signal transmitted to the EBG pattern 610 is attenuated so that it is less than the power of an incident signal. Therefore, the power difference between an incident wave and a reflected wave is used as a recognition element for the EBG pattern 610 in the second embodiment of the present invention, so that a security code can be identified and recognized depending on whether or not the EBG pattern 610 resonates.

An apparatus for recognizing a security code having an EBG pattern, which can detect and recognize a unique code depending on whether the EBG pattern 610 resonates or not, will be described in detail using the resonance characteristics of the EBG pattern 610 in the present invention.

Figure 7:
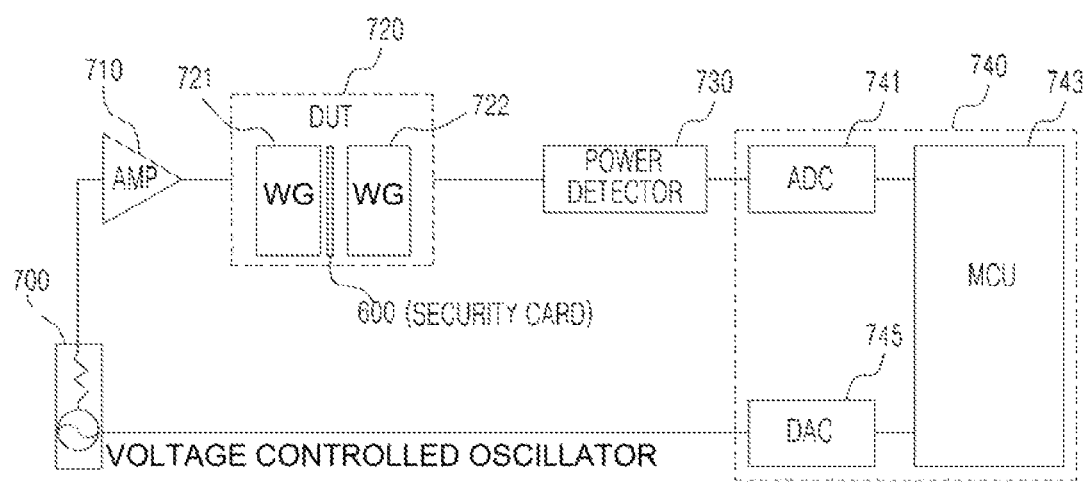
FIG. 7 is a block diagram schematically showing the configuration of an apparatus for recognizing a security code having an EBG pattern according to the second embodiment of the present invention.

FIG. 7 is a circuit diagram showing the configuration of the apparatus for recognizing an EBG pattern in order to recognize a security code having an EBG pattern which has frequency reflection characteristics according to the second embodiment of the present invention.

Referring to FIG. 7, the apparatus includes a voltage controlled oscillator 700, a power amplifier 710, a waveguide unit 720 and 722, a power detector 730 and a data control unit 740.

The voltage controlled oscillator 700 sequentially generates various types of frequency signals. That is, the voltage controlled oscillator 700 sequentially generates and outputs desired frequency signals in a specific frequency band. Here, m frequency signals can be generated by the voltage controlled oscillator 700, and the m frequency signals are m signals to be incident on the security card 600 on which the EBG pattern is formed.

The power amplifier 710 amplifies the power level of the incident signal generated by the voltage controlled oscillator 700 and transmits it to the waveguide unit 720.

The waveguide unit 720 includes a first waveguide 721 and a second waveguide 722. The waveguides 721 and 722 are provided in a Device Under Test (DUT), so that the security card 600 is inserted therebetween.

The first waveguide 721 enables the signal amplified by the power amplifier 710 to be incident on the EBG pattern 610 of the security card 600. The second waveguide 722 receives a transmitted signal passed through the EBG pattern 610. Further, the second waveguide 722 transmits the received transmitted signal to the power detector 730.

The power detector 730 receives the transmitted signal transmitted from the second waveguide 722 and the amplified signal incident on the EBG pattern from the first waveguide 721. The power detector 730 detects the power difference between the received transmitted signal and the incident signal which is incident through the first waveguide 721, and compares the detected power difference with the reference power difference. Here, the power of the incident signal, to be compared with the power of the transmitted signal and the reference power difference, can be set in the power detector 730.

The power detector 730 compares the power difference between the incident signal and the transmitted signal with the reference power difference, and generates power data based on the results of the comparison. Here, this power data is an electrical signal generated based on the results of the comparison of the power difference between the incident signal and the transmitted signal with the reference power difference. The electrical signal may be a voltage signal at a high or low level. For example, if, as a result of the comparison of the power difference performed by the power detector 730, the power difference between the incident signal and the transmitted signal is equal to or less than the reference power difference, a voltage signal at a high level may be generated, and, if the power difference between the incident signal and the transmitted signal is greater than the reference power difference, a voltage signal at a low level may be generated.

Meanwhile, when the reference power difference is set in the power detector 730, signal path loss occurring when the EBG security card is not inserted is measured, so that path loss can be compensated for, and data for more accurate reference power difference can be obtained.

The data control unit 740 receives a high or low level electrical signal from the power detector 730, and determines whether the EBG security code is recognized using the received electrical signal. Further, the data control unit 740 functions to control the voltage controlled oscillator 700 so that the voltage controlled oscillator 700 can generate a subsequent incident signal depending on the results of the determination of whether or not the EBG security code is recognized.

The data control unit 740 includes an analog-to-digital converter 741, a micro controller unit 743, and a digital-to-analog converter 745.

The analog-to-digital converter 741 converts the electrical signal from the power detector 730 into a digital signal. For example, if the voltage level of the electrical signal from the power detector 730 is a high level, the analog-to-digital converter 741 converts the received electrical signal into a digital code 1, and, if the voltage level of the electrical signal is a low level, the analog-to-digital converter 741 converts the received electrical signal into a digital code 0.

The micro controller unit 743 compares the digital code 1 or 0 obtained by the conversion of the analog-to-digital converter 741 with a preset digital code 1 or 0, and determines whether they are identical with each other. Here, if the digital code generated by the analog-to-digital converter 741 is identical with the preset digital code, the micro controller unit 743 outputs a control signal so that the voltage controlled oscillator 700 can generate a subsequent incident signal. Here, the control signal from the micro controller unit 743 is converted into an electrical signal by the digital-to-analog converter 745, and then the resulting signal is output to the voltage controlled oscillator 700. Therefore, the voltage controlled oscillator 700 receives the electrical signal obtained by the conversion of the analog-to-digital converter 745, and then generates a subsequent incident signal.

If the digital code generated using the EBG pattern is completely identical with the preset digital code, the micro controller unit 743 provides notification that the security code having an EBG pattern is recognized, and terminates the process of recognizing the EBG pattern Meanwhile, if the digital code generated using the EBG pattern is not identical with the preset digital code, the micro controller unit 743 provides notification that the security code having an EBG pattern is not recognized, and terminates the process of recognizing the EBG pattern.

Figure 8:
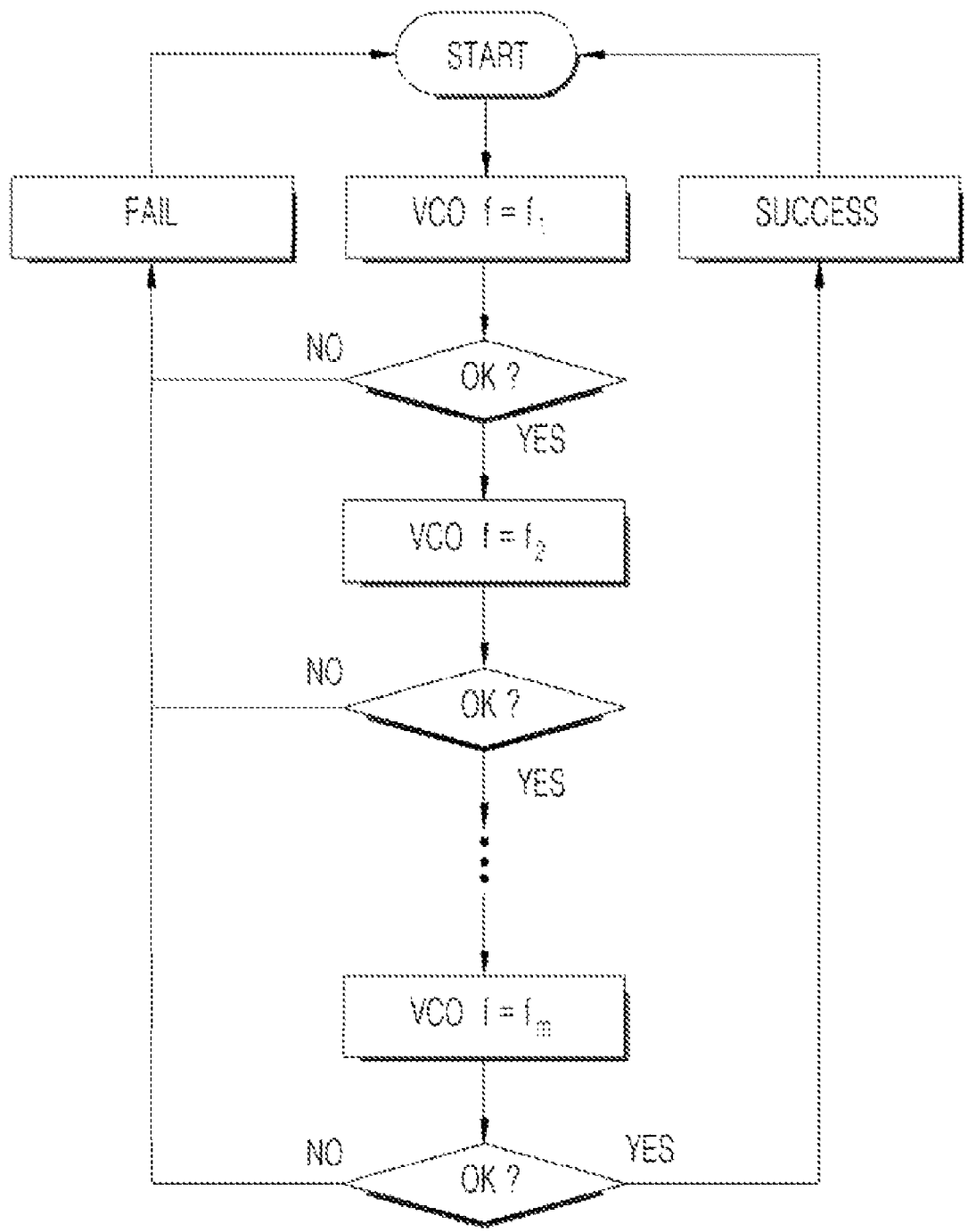
FIG. 8 is a flowchart showing a system for recognizing a security code having an EBG pattern according to the second embodiment of the present invention.

FIG. 8 is a flowchart for a system recognizing a security code having an EBG pattern according to the second embodiment of the present invention.

In the flowchart of FIG. 8, VCO f=$f_1$ means that a first incident signal $f_1$ is generated by the voltage controlled oscillator 700 in order to recognize a security code having an EBG pattern. Further, "OK?" means that it is determined whether the frequency transmission characteristics of an EBG pattern exist in an authentication range. Therefore, as shown in the flowchart of FIG. 8, it is sequentially determined whether security code having an EBG pattern 710 exists in the authentication range with respect to each of m incident signals sequentially generated by the voltage controlled oscillator 700. If, as a result of the determination, the security code having an EBG pattern 710 exists in the authentication range, it is determined as "success." Meanwhile, if it is determined that the security code having an EBG pattern 710 does not exist in the authentication range during the determination process, it is promptly determined as "failure."

Figure 9:
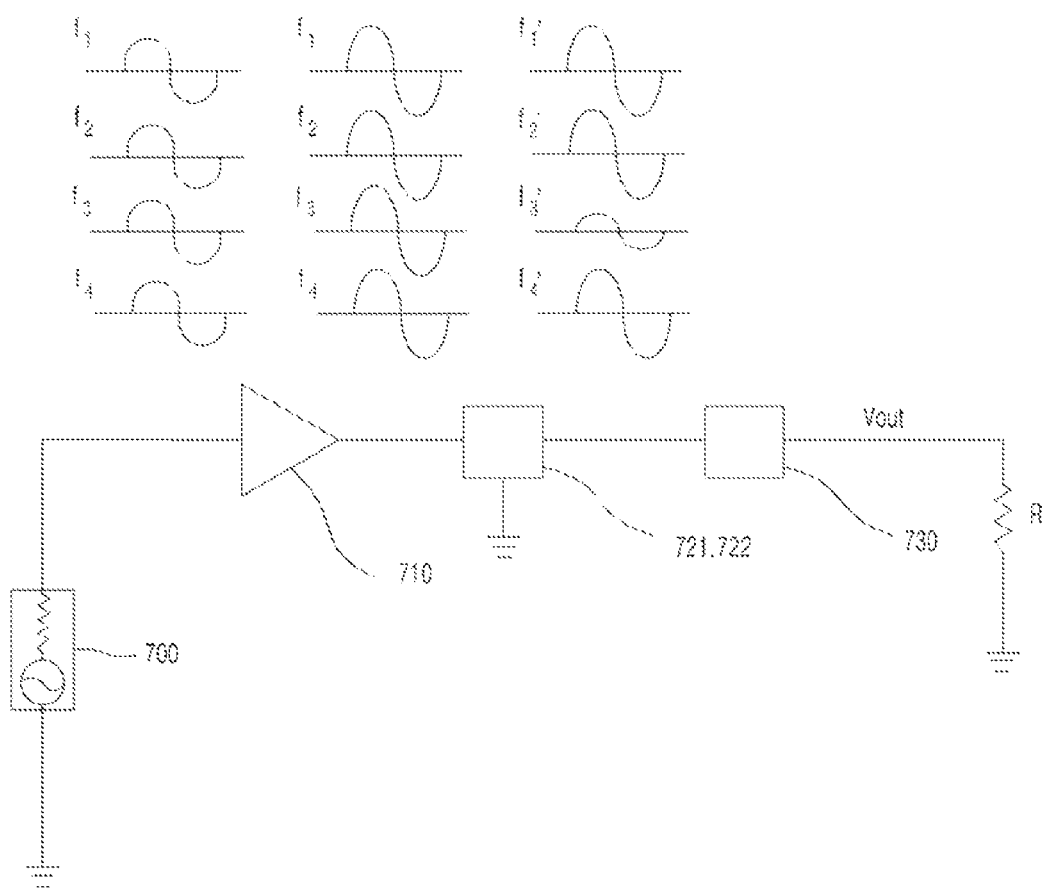
FIG. 9 is a view showing a simulation model for a system for recognizing a security code having an EBG pattern according to the second embodiment of the present invention.

FIG. 9 is a view showing a simulation model for a system for recognizing the transmission characteristics of an EBG pattern according to the second embodiment of the present invention.

As shown in FIG. 9, the system for recognizing an EBG pattern according to the second embodiment of the present invention uses the voltage difference between incident waves $f_1$ to $f_4$ and reflected waves $f_1'$ to $f_4'$ in order to recognize the security code having an EBG pattern.

The signal wave forms $f_1$ to $f_4$ of FIG. 9 are illustrated by modeling signal wave forms and amplitudes appearing at respective ends. In FIG. 9, the signal wave forms $f_1$ to $f_4$ appearing at the front end of the waveguides 721 and 722 (the signal wave forms shown in the left side of the waveguides 721 and 722) are the wave forms of the incident signals which are incident on the security card 600 through the waveguide 240. Further, the signal wave forms $f_1'$ to $f_4'$ appearing at the rear end of the waveguides 721 and 722 (the signal wave forms shown in the right side of the waveguides 721 and 722) are the wave forms of the transmitted signals which are passed through the security card 600.

With reference to the signal wave forms of the front and rear ends of the waveguides 721 and 722 of FIG. 9, when the first incident signal $f_1$ generated by the voltage controlled oscillator 700 is incident, the EBG pattern 610 does not resonate. Therefore, the first transmitted signal $f_1'$ is the same as the first incident signal $f_1$ since there is no amplitude difference between the first transmitted signal $f_1'$ and the first incident signal $f_1$. Meanwhile, when the second incident signal $f_2$ is incident, the EBG pattern 610 resonates. Therefore, the amplitude of the second transmitted signal $f_2'$ is largely attenuated when compared with that of the second incident signal $f_2$. The process of detecting a power difference is performed in this way through the fourth incident signal $f_4$ and the fourth transmitted signal $f_4'$.

Figure 10A:
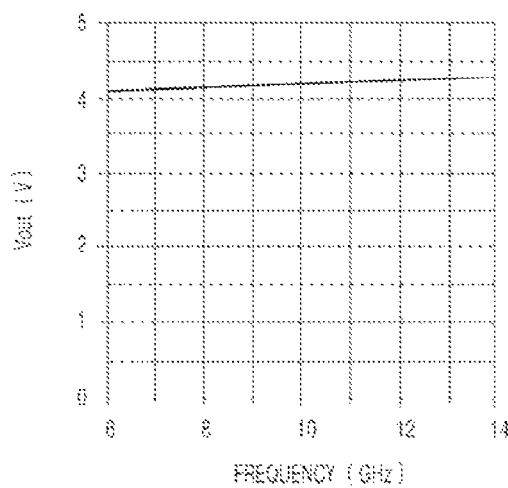
FIG. 10A is a graph showing the results of a simulation obtained by a power detector for a security product on which an EBG pattern is not formed according to the second embodiment of the present invention.

FIG. 10A is a graph showing the results of a simulation obtained by processing a recognition process for a security card on which an EBG pattern is not formed.

Figure 10B:
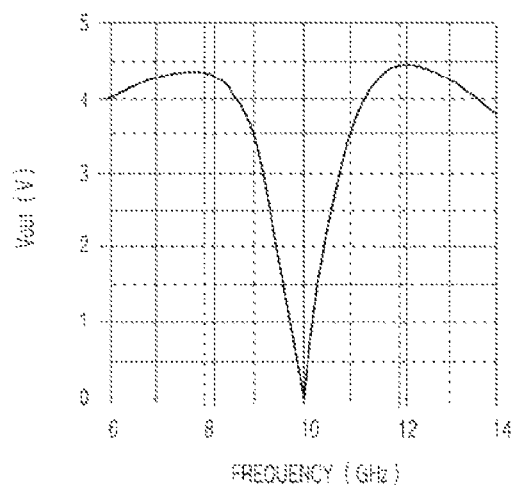
FIG. 10B is a graph showing the results of a simulation obtained by the power detector for a security product on which an EBG pattern is formed according to the second embodiment of the present invention, and a method of digitizing the results.

FIG. 10B is a graph showing the results of a simulation obtained by processing the recognition process for a security card 600 on which an EBG pattern 610 is formed according to the second embodiment of the present invention. That is, FIG.

10B is a view showing an electrical signal from the power detector 730 of FIG. 7 and a method of digitizing the electrical signal.

With reference to FIG. 10B, the transmission characteristics of an EBG pattern are understood using incident signals having frequencies of 7 GHz, 8.2 GHz, 10 GHz, and 12.1 GHz, respectively. Therefore, when the incident signals $f_2$ and $f_4$ having frequencies of 7 GHz, 8.2 GHz, and 12.1 GHz are incident, resonance does not occur, so that a power difference does not occur between the incident waves and the reflected waves. Therefore, with regard to the frequencies of 7 GHz, 8.2 GHz, and 12.1 GHz, electrical signals $V_{out}$ at a +4 V or higher voltage level are output by the phase detector 730.

Meanwhile, when the incident signal $f_3$ having a frequency of 10 GHz is incident, resonance occurs. Accordingly, an amplitude difference between the incident wave and the reflected wave exists, with the result that an electrical signal $V_{out}$ at a low level, that is, 0 V, is output from the power detector 730.

As described above, each of the electrical signals $V_{out}$ at a high or low level from the power detector 730 is converted into a digital code through the data control unit 740, and it is determined whether the digital code obtained by the conversion is recognized. For example, if, as a result of the detection of a power difference for an incident signal of 7 GHz, an electrical signal $V_{out}$ at a high level, that is, +4 V (7 GHz), is transmitted from the power detector 730 to the data control unit 740, the data control unit 740 converts the electrical signal $V_{out}$ into the digital code 1, and determines whether the digital code 1 obtained by the conversion is identical with the preset digital code. Here, if the digital codes are identical with each other, the data control unit 740 performs a process for detecting a power difference for the subsequent incident signal of 8.2 GHz, receives an electrical signal $V_{out}$ at a low level, that is, 0 V, as a result of the detection, and converts the electrical signal $V_{out}$ into the digital code 0.

Whether the digital code obtained by the conversion is identical with the preset digital code is determined by the micro controller unit 743. When the process of recognizing a security code for each of the incident signals $f_1$ to $f_4$ ends in the above-described manner, a digital code 1101 is generated as shown in FIG. 10B, so that the security code of the security card 600 on which the EBG pattern is formed can be identified and recognized.

As described above, when a recognition process is performed on the four frequencies $f_1$ to $f_4$, the signals of the four frequencies $f_1$ to $f_4$ are converted into a 4-bit security code. Here, if it is assumed that the analog-to-digital converter has m-bit resolution, a value ranging from 0 to m is detected as the characteristics for a single frequency, so that it is possible to realize a security code having more bits, that is, m-bit code for n frequencies can be realized. Further, various types of code can be realized through a method of sequentially arranging a plurality of EBG security cards, and detecting the security code in a sliding manner.

The system for recognizing a security code having an EBG pattern according to the present invention requires about 2 μsec in order to obtain characteristics for a single frequency. When it is assumed that characteristics for 10 frequencies are detected in order to authenticate an EBG security code, about 20 μsec are required. Therefore, there is no time limit required to detect an EBG security code using the recognition system according to the present invention.

According to the present invention, there is disclosed an apparatus which can identify and recognize a security code having an EBG pattern by detecting and digitizing it using reflection characteristics and transmission characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for detecting and recognizing a security code of a security product having an Electromagnetic Band-Gap (EBG) pattern arranged on the security product, the EBG being configured to resonate at a specific frequency, the apparatus comprising:
    a voltage controlled oscillator configured to sequentially generate one or more incident signals having various frequencies;
    a power divider configured to divide power of each of the one or more incident signals generated by the voltage controlled oscillator into halves, and to output a first incident signal and a second incident signal;
    a waveguide configured to enable the first incident signal to be incident on the EBG pattern, and to receive a reflected signal from the EBG pattern;
    a phase detector configured to detect a phase difference between the reflected signal received from the waveguide and the second incident signal received from the power divider, and to generate and output phase data the detected phase difference; and
    a data control unit configured to determine whether the security code having the EBG pattern is recognized by using the phase data received from the phase detector, and to control the voltage controlled oscillator to sequentially generate the incident signal.

2. The apparatus as set forth in claim 1, further comprising a power amplifier configured to amplify the power of the incident signal generated by the voltage controlled oscillator, and to output a resulting signal to the power divider.

3. The apparatus as set forth in claim 1, further comprising a circulator configured to transmit the first incident signal received from the power divider to the waveguide, and to transmit the reflected signal received from the waveguide to the phase detector.

4. The apparatus as set forth in claim 1, wherein the security product, on which the EBG pattern is formed, has Perfect Magnetic Conductor (PMC) reflection characteristics in which a phase difference between an incident wave and a reflected wave is 0° when resonance occurs, and has Perfect Electric Conductor (PEC) reflection characteristics in which the phase difference between the incident wave and the reflected wave is 180° when resonance does not occur.

5. The apparatus as set forth in claim 1, wherein the phase detector is configured to output an electrical signal having a voltage level which changes depending on the detected phase difference between the reflected signal and the second incident signal.

6. The apparatus as set forth in claim 5, wherein the data control unit comprises:
    an analog-to-digital converter configured to convert the electrical signal received from the phase detector into a digital signal;
    a micro controller unit configured to determine whether the digital signal obtained by the conversion of the analog-to-digital converter is identical with a preset digital signal, and to output a control signal which enables the voltage controlled oscillator to generate a subsequent incident signal depending on a result of the determination; and a digital-to-analog converter configured to convert the control signal received from the micro controller unit into an electrical signal, and to output the electrical signal to the voltage controlled oscillator.

7. An apparatus for detecting and recognizing a security code of a security product having an Electromagnetic Band Gap (EBG) pattern arranged on the security product, the EBG being configured to resonate at a specific frequency, the apparatus comprising:
- a voltage controlled oscillator configured to sequentially generate one or more incident signals having various frequencies;
- a waveguide unit configured to enable each of the one or more incident signals generated by the voltage controlled oscillator to be incident on the EBG pattern, and to receive a transmitted signal passed through the EBG pattern;
- a power detector configured to calculate a power difference between the transmitted signal received from the waveguide unit and the one or more incident signals, to compare sizes of the calculated power difference and a reference power difference, and to generate and output power data based on results of the comparison; and
- a data control unit configured to determine whether the security code having the EBG pattern is recognized by using the power data received from the power detector, and to control the voltage controlled oscillator to sequentially generate the one or more incident signals.

8. The apparatus as set forth in claim 7, further comprising a power amplifier configured to amplify power of the one or more incident signals generated by the voltage controlled oscillator, and to output a resulting signal to the waveguide unit.

9. The apparatus as set forth in claim 7, wherein the waveguide unit comprises:
- a first waveguide configured to enable the one or more incident signals generated by the voltage controlled oscillator to be incident on the EBG pattern; and
- a second waveguide configured to receive the transmitted signal passed through the EBG pattern.

10. The apparatus as set forth in claim 7, wherein the power detector is configured to output an electrical signal having a voltage level which changes depending on the result of the comparison of the sizes between the calculated power difference and the reference power difference.

11. The apparatus as set forth in claim 10, wherein the data control unit comprises:
- an analog-to-digital converter configured to convert the electrical signal received from the power detector into a digital signal;
- a micro controller unit configured to determine whether the digital signal obtained by the conversion of the analog-to-digital converter is identical with a preset digital signal, and to output a control signal which enables the voltage controlled oscillator to generate a subsequent incident signal depending on a result of the determination; and
- a digital-to-analog converter configured to convert the control signal from the micro controller unit into an electrical signal, and to output the electrical signal to the voltage controlled oscillator.

12. An apparatus for detecting and recognizing a security code of a security product having an Electromagnetic Band Gap (EBG) pattern arranged on the security product, the EBG being configured to resonate at a specific frequency, the apparatus comprising:
- a voltage controlled oscillator configured to sequentially generate one or more incident signals having various frequencies;
- a power divider configured to divide power of each of the one or more incident signals generated by the voltage controlled oscillator into halves, and to output a first incident signal and a second incident signal;
- a waveguide configured to enable the first incident signal to be incident on the EBG pattern, and to receive a reflected signal from the EBG pattern;
- a phase detector configured to detect a phase difference between the reflected signal received from the waveguide and the second incident signal received from the power divider, and to generate and output phase data based on the detected phase difference;
- a data control unit configured to determine whether the security code having the EBG pattern is recognized by using the phase data received from the phase detector, and to control the voltage controlled oscillator to sequentially generate the incident signal;
- a power amplifier configured to amplify the power of the incident signal generated by the voltage controlled oscillator, and to output a resulting signal to the power divider; and
- a circulator configured to transmit the first incident signal received from the power divider to the waveguide, and to transmit the reflected signal received from the waveguide to the phase detector;

wherein the security product, on which the EBG pattern is formed, has Perfect Magnetic Conductor (PMC) reflection characteristics in which a phase difference between an incident wave and a reflected wave is 0° when resonance occurs, and has Perfect Electric Conductor (PEC) reflection characteristics in which the phase difference between the incident wave and the reflected wave is 180° when resonance does not occur, wherein the phase detector is configured to output an electrical signal having a voltage level which changes depending on the detected phase difference between the reflected signal and the second incident signal, and wherein the data control unit comprises:
- an analog-to-digital converter configured to convert the electrical signal received from the phase detector into a digital signal;
- a micro controller unit configured to determine whether the digital signal obtained by the conversion of the analog-to-digital converter is identical with a preset digital signal, and to output a control signal which enables the voltage controlled oscillator to generate a subsequent incident signal depending on a result of the determination; and
- a digital-to-analog converter configured to convert the control signal received from the micro controller unit into an electrical signal, and to output the electrical signal to the voltage controlled oscillator.

13. An apparatus for detecting and recognizing a security code of a security product having an Electromagnetic Band Gap (EBG) pattern arranged on the security product, the EBG being configured to resonate at a specific frequency, the apparatus comprising:
- a voltage controlled oscillator configured to sequentially generate one or more incident signals having various frequencies;
- a waveguide unit configured to enable each of the one or more incident signals generated by the voltage controlled oscillator to be incident on the EBG pattern, and to receive a transmitted signal passed through the EBG pattern;

a power detector configured to calculate a power difference between the transmitted signal received from the waveguide unit and the one or more incident signals, to compare sizes of the calculated power difference and a reference power difference, and to generate and output power data based on results of the comparison;

a data control unit configured to determine whether the security code having the EBG pattern is recognized by using the power data received from the power detector, and to control the voltage controlled oscillator to sequentially generate the one or more incident signals; and a power amplifier configured to amplify power of the one or more incident signals generated by the voltage controlled oscillator, and to output a resulting signal to the waveguide unit;

wherein the waveguide unit comprises:
  a first waveguide configured to enable the one or more incident signals generated by the voltage controlled oscillator to be incident on the EBG pattern; and
  a second waveguide configured to receive the transmitted signal passed through the EBG pattern, wherein the power detector is configured to output an electrical signal having a voltage level which changes depending on the result of the comparison of the sizes between the calculated power difference and the reference power difference, and wherein the data control unit comprises:
  an analog-to-digital converter configured to convert the electrical signal received from the power detector into a digital signal;
  a micro controller unit configured to determine whether the digital signal obtained by the conversion of the analog-to-digital converter is identical with a preset digital signal, and to output a control signal which enables the voltage controlled oscillator to generate a subsequent incident signal depending on a result of the determination; and
  a digital-to-analog converter configured to convert the control signal received from the micro controller unit into an electrical signal, and output the electrical signal to the voltage controlled oscillator.

* * * * *